United States Patent
Chen et al.

(10) Patent No.: US 8,687,597 B2
(45) Date of Patent: Apr. 1, 2014

(54) AUTO-DISCOVERY AND MANAGEMENT OF BASE STATION NEIGHBORS IN WIRELESS NETWORKS

(75) Inventors: Liang Chen, Kanata (CA); Anshuman Tyagi, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 431 days.

(21) Appl. No.: 12/221,951

(22) Filed: Aug. 8, 2008

(65) Prior Publication Data

US 2009/0052350 A1 Feb. 26, 2009

Related U.S. Application Data

(60) Provisional application No. 60/954,895, filed on Aug. 9, 2007.

(51) Int. Cl.
*H04W 4/00* (2009.01)
*H04W 40/00* (2009.01)

(52) U.S. Cl.
USPC ........ 370/332; 370/310.2; 370/338; 455/439; 455/446

(58) Field of Classification Search
USPC .............. 370/255, 310.2, 328, 331, 332, 334, 370/338; 455/434, 436, 439, 446, 73, 561; 445/434, 436, 439, 446, 73, 561
See application file for complete search history.

(56) References Cited

U.S. PATENT DOCUMENTS

| | | | |
|---|---|---|---|
| 5,875,186 A * | 2/1999 | Belanger et al. .............. | 370/331 |
| 5,953,320 A * | 9/1999 | Williamson et al. .......... | 370/252 |
| 6,041,236 A * | 3/2000 | Bernardin et al. ............ | 455/446 |
| 6,201,969 B1 | 3/2001 | Meier | |
| 6,298,219 B1 * | 10/2001 | Patronen et al. .............. | 455/424 |
| 6,411,819 B1 * | 6/2002 | Gutowski ...................... | 455/525 |
| 6,442,389 B1 * | 8/2002 | Marcum ........................ | 455/437 |
| 6,560,459 B1 * | 5/2003 | Wong ............................ | 455/447 |
| 7,031,266 B1 * | 4/2006 | Patel et al. .................... | 370/254 |
| 7,088,959 B2 * | 8/2006 | Ho et al. ....................... | 455/69 |

(Continued)

FOREIGN PATENT DOCUMENTS

| | | |
|---|---|---|
| CN | 1434595 | 8/2003 |
| CN | 1454016 | 11/2003 |

(Continued)

OTHER PUBLICATIONS

WO2007027033; "Method and Apparatus for optimizing Neighbor List Automatically in Synchronous CDMA Network"; published Mar. 8, 2007; Kim.*

(Continued)

*Primary Examiner* — Benjamin H Elliott, IV
(74) *Attorney, Agent, or Firm* — Fish & Richardson P.C.

(57) ABSTRACT

Systems and methods are disclosed that include determining a local node configuration for a local network node. The local network node configuration can include a local range and a local location. In addition, these systems and methods can include receiving a remote network node configuration for a remote network node via a communications link. The remote network node configuration can include a remote range and a remote location. Also these systems and methods can further include generating a neighbor list that includes the remote network node and the local network node. The neighbor list can be determined using the local network node configuration and the remote network node configuration.

20 Claims, 6 Drawing Sheets

(56) References Cited

U.S. PATENT DOCUMENTS

| | | | |
|---|---|---|---|
| 7,313,113 B1 * | 12/2007 | Hills et al. | 370/332 |
| 7,480,486 B1 * | 1/2009 | Oh et al. | 455/7 |
| 7,664,120 B2 * | 2/2010 | Hershey | 370/400 |
| 2003/0199269 A1 * | 10/2003 | Tobe et al. | 455/422.1 |
| 2004/0077354 A1 * | 4/2004 | Jason et al. | 455/450 |
| 2004/0127191 A1 * | 7/2004 | Matsunaga | 455/403 |
| 2005/0059411 A1 * | 3/2005 | Zhengdi | 455/456.1 |
| 2005/0202828 A1 * | 9/2005 | Pecen et al. | 455/453 |
| 2006/0039329 A1 | 2/2006 | Samuel et al. | |
| 2006/0223520 A1 * | 10/2006 | Laroia et al. | 455/422.1 |
| 2006/0276202 A1 * | 12/2006 | Moeglein et al. | 455/456.1 |
| 2007/0111746 A1 * | 5/2007 | Anderson | 455/522 |
| 2007/0291770 A1 * | 12/2007 | Kitazoe | 370/395.52 |
| 2007/0293235 A1 * | 12/2007 | Inayoshi et al. | 455/455 |
| 2008/0002628 A1 * | 1/2008 | Bi et al. | 370/335 |
| 2008/0198798 A1 | 8/2008 | Wu et al. | |
| 2008/0225797 A1 * | 9/2008 | Kim | 370/331 |
| 2009/0005052 A1 * | 1/2009 | Abusch-Magder et al. | 455/446 |
| 2009/0052350 A1 * | 2/2009 | Chen et al. | 370/255 |
| 2013/0010644 A1 | 1/2013 | Chen et al. | |

FOREIGN PATENT DOCUMENTS

| | | |
|---|---|---|
| CN | 1523916 | 8/2004 |
| CN | 1960527 | 5/2007 |
| EP | 0963130 | 12/1999 |
| JP | 10-108252 | 4/1998 |
| JP | 2003-509982 | 3/2003 |
| JP | 2002/224882 | 8/2003 |
| JP | 2003-348637 | 12/2003 |
| JP | 2004-282695 | 10/2004 |
| WO | 2007027034 | 3/2007 |
| WO | WO 2007027033 A1 * | 3/2007 |

OTHER PUBLICATIONS

International Search Report issued on Jan. 28, 2009 in connection with International Patent Application No. PCT/US2008/072695.
Written Opinion issued on Jan. 28, 2009 in connection with International Patent Application No. PCT/US2008/072695.
Office Action issued in U.S. Appl. No. 13/618,685 on Oct. 22, 2012; 26 pages.
International Preliminary Report on Patentability under Chapter I issued in International Application No. PCT/US2008/072695 on Feb. 18, 2010; 9 pages.
Office Action issued in Chinese Application No. 200880109344.9 on Aug. 21, 2012; 13 pages.
Office Action issued in U.S. Appl. No. 13/618,685 on Apr. 30, 2013; 17 pages.
Office Action issued in Japanese Application No. 2010-520337 on Aug. 16, 2013; 7 pages.
Rejection Decision issued in Chinese Application No. 200880109344.9 on Sep. 3, 2013; 8 pages.
Office Action issued in Japanese Application No. 2010-520337 on Dec. 10, 2012; 13 pages.

* cited by examiner

| | IE | M/O | NOTES |
|---|---|---|---|
| 510 | LOCATION : : LATITUDE | M | BS LATITUDE. ALONG WITH LONGITUDE SPECIFIES LOCATION |
| 520 | LOCATION : : LONGITUDE | M | BS LONGITUDE |
| 530 | RANGE | M | BS RANGE |
| 540 | DIRECTION | O | CENTRE ANGLE |
| 550 | ANGLE | O | COVERAGE ANGLE |

US 8,687,597 B2

AUTO-DISCOVERY AND MANAGEMENT OF BASE STATION NEIGHBORS IN WIRELESS NETWORKS

CROSS-REFERENCE TO RELATED APPLICATION

This application claims priority under 35 USC 119(e) to U.S. Provisional Application Ser. No. 60/954,895, filed on Aug. 9, 2007, which is incorporated herein by reference.

TECHNICAL FIELD

The present invention relates generally to wireless communication systems, and more particularly to a network architecture and methods for base station neighbor automatic discovery (identification or learning), configuration and/or dynamic tuning to optimize network performance.

BACKGROUND

Some of the most challenging and costly tasks undertaken by network operators when introducing new telecommunications infrastructure or adding capacity to existing infrastructure (such as adding access points ("APs" or base transceiver stations ("BTSs", also referred to herein as "base stations")) includes network planning, development and operational efforts. The efforts to setup and optimize such networks are significant and traditionally necessitate lengthy periods until attainment of an optimum and stable system. This is usually done based on initial, manual configuration of the BTSs at the time of deployment.

Base station neighbor information is critical for wireless network operation, for such information is utilized by base stations, network controllers and access service network ("ASN") gateways (depending upon network architecture) for various applications, including Radio Resource Management (RRM), neighbor BTS communication associated with handoffs (handovers), and multi-step paging based on BTS neighbor topology. This neighbor information is also crucial to the successful operation of emerging, high data rate 4G wireless systems, such as those built (or to be built) in conformance with wireless specifications such as LTE (Long Term Evolution) promulgated by 3GPP (Third Generation Partnership Project) and that promulgated by the Worldwide Interoperability for Microwave Access Forum (WiMAX) for interface auto discovery. This WiMAX specification is also known as the Institute of Electrical and Electronic Engineers (IEEE) 802.16e-2005 standard, and is incorporated herein by reference.

Access points and base transceiver stations provide users (and their communications devices known as "subscriber stations") wireless connectivity to wireless access service networks (ASN). These access points have different names depending upon network architecture and the standard to which the network is constructed, but they generally share similar characteristics, such as antenna(s) and base station transceiver(s). In cellular deployments, the antennas are mounted to physical structures, such as towers, buildings and other generally elevated structures. Once connected to the ASN, users have the ability to move about the ASN, with their call sessions (data or voice) being transferred as necessary from one base station to another. Within the network, each BTS is connected (via wireless or wireline) to a controller node. The controller node can be in the form of a "gateway" (GW) generally responsible for controlling and communicating with a number of BTSs. Such gateways can be connected to a global network, which can be the public switched telephone network ("PSTN"), Internet, or other wired or wireless communications network. It is critical for wireless network operators to ensure that call sessions maintain continuity as these call sessions are handed off from one BTS to another. As noted above, network operators typically populate lists of BTS neighbors at the time of network turn-up, but such manual configuration fails to take into account the inherently dynamic nature of networks, as planned (and unplanned) BTS service outages arise, or BTSs otherwise fully operational become unavailable for relatively short periods of time due to operation at capacities that inhibit participation in call handoffs, as can occur incident to activities such as large gatherings (e.g., major sporting and theatrical/musical events), or extraordinary events (accidents on highways, etc.).

Deployment and functioning of emerging 4G wireless technologies, such as LTE and WiMAX face many of the challenges existing in cellular/PCS networks. However, some of these challenges are more pronounced in these emerging 4G technologies as a consequence of their deployment, in many instances, at higher frequency bands (1.5 GHz to 11 GHz). One of the problems impacting such deployments concerns "shadowing", a phenomenon involving diffraction around obstacles (such as buildings, water towers, etc.). Such diffraction becomes more problematic at higher frequencies, as the signal wavelength correspondingly diminishes. Moreover, at elevated frequencies (and depending upon prevailing RF conditions), line of sight (LOS) between the BTS and the subscriber terminal can become more of an issue. While urban areas are places where high data rates would be beneficial, these urban areas also exacerbate the LOS problem (e.g., buildings, obstacles, etc). Some locations will have no LOS, while other locations will have acceptable LOS in the vicinity of the cell site (BTS location), with poor LOS in areas further from the cell site. The 4G wireless technologies are designed for high data rates. Typically, high data rates can only be achieved with high signal-to-noise ratios (SNRs). Because LOS is not possible (or limited) in many locations, many subscriber stations are severely impacted in locations resulting in no LOS with low SNR. Often a subscriber station behind an obstacle may acquire the network (i.e., the control channel can be detected), but data throughput rates are low. A high number of users will be in disadvantaged locations that will not support high data rates between the subscriber station and BTS. Therefore, combating the shadow/LOS problem is a major issue in the deployment and operation of emerging 4G wireless technologies at higher frequencies in urban and dense urban areas.

Accordingly, there are needed infrastructure components and methods that provide self-configuration and self-optimization solutions for automatic discovery (identification or learning) of BTS neighbors (and BTS neighbor information) to avoid the individual and manual provisioning of neighbors on each BTS and controller. Such is desirable in instances of initial network deployment, capacity enhancements (such as arise from the addition of further BTSs), service outages and restarts, and other such situations that impact the network. Further, as operating conditions change in the network due to operation limitations as described above, it is important to be able to dynamically tune (i.e., identify) the list of neighbor BTSs available for handoff communications when the network conditions change (e.g., signal degradation due to shadowing (i.e., signal degradation due to physical obstructions in the path between the servicing BTS and the user, limitations in the available line of sight to the user, changes in BTS range, etc.).

SUMMARY

In accordance with one embodiment, a method is disclosed that includes determining a local node configuration for a local network node. The local network node configuration can include a local range and a local location. In addition, this method can include receiving via a communications link a remote network node configuration for a remote network node. The remote network node configuration can include a remote range and a remote location. Also this method can further include generating a neighbor list that includes the remote network node and the local network node. The neighbor list can be determined using the local network node configuration and the remote network node configuration.

In accordance with another embodiment, a method is disclosed that includes obtaining a first information about a first base station. The first information can include location and range information relating to the first base station. This method includes sending the first information to a first server. Also disclosed in this embodiment is obtaining a second information about a second base station. The second information comprises location and range information relating to the second base station. In addition, this method includes sending the second information about the second base station to the server, generating a neighbor list from the first information and the second information, and transmitting the neighbor list to the first base station and the second base station.

In yet another embodiment, a system is disclosed that includes a first base station. The first base station is capable of storing first identification information relating to the range of the first base station and the location of the first base station and communicating with a first network. This system may also include a second base station that is capable of storing second identification information relating to the range of the second base station and the location of the second base station. The second base station is also capable of communication with a second network. Thus system may further include a server that is capable of communication with the first network and the second network. The server is capable of receiving the first and second identification information, creating a neighbor list based upon the first and the second identification information, and transmitting the neighbor list to the first base station and the second base station.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
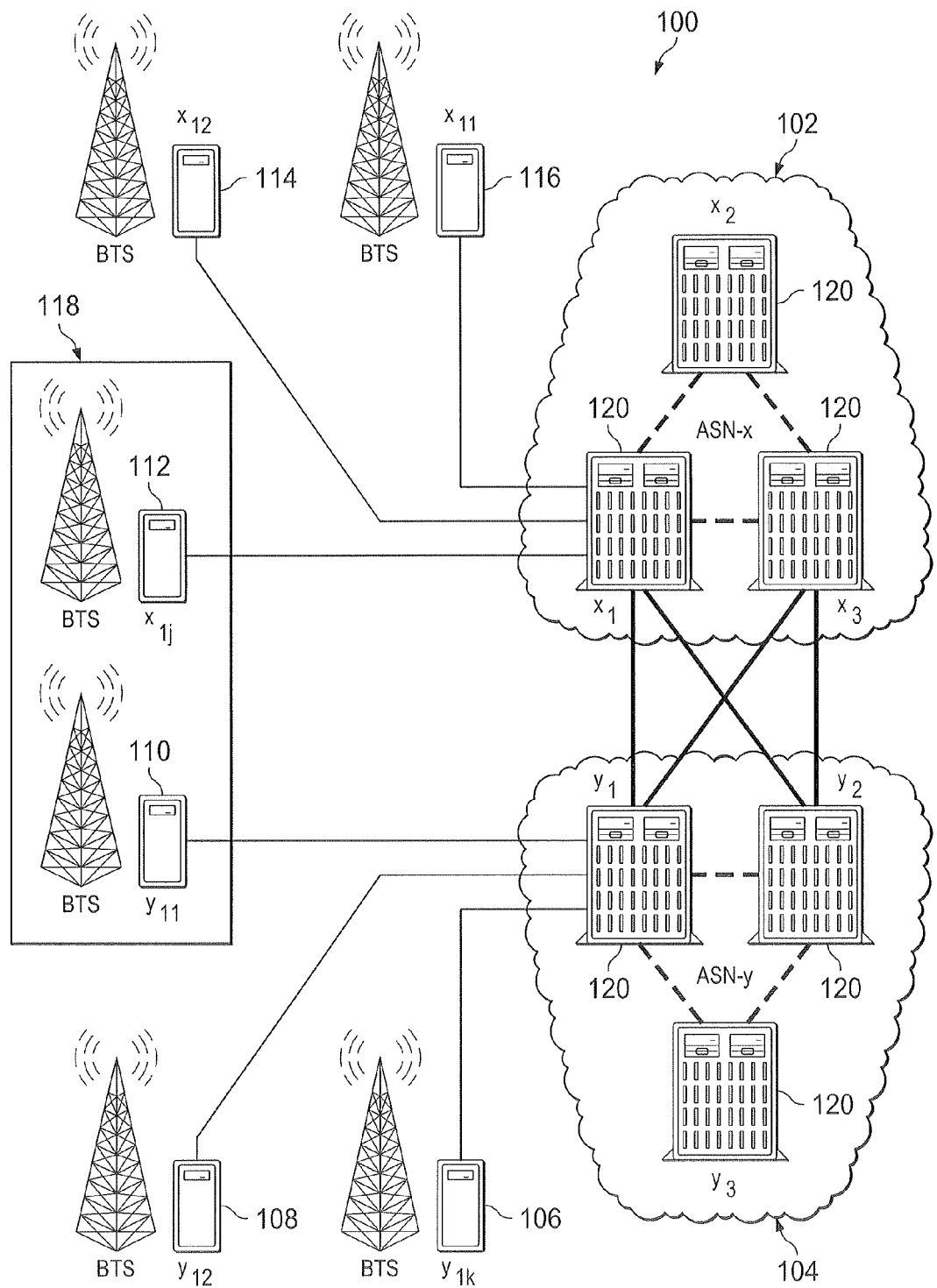
FIG. 1 depicts a high level diagram of an example diagram with a plurality of BTSs and ASNs within an illustrative (such as WiMAX) wireless communications network, in accordance with one embodiment of the present disclosure.

FIG. 1 illustrates an example of a communications network architecture or system 100 in accordance with the present disclosure. The network or system 100 shown in FIG. 1 is for illustration purposes only, and represents a plurality of cells or sectors. Other embodiments of the system 100, constructed in conformance of any of a multitude of standards, may be used without departing from the scope of this disclosure. Reference to "standards" as used herein is meant to encompass existing and future versions of the referenced standards, as well as standards encompassing the principles of the subject matter disclosed and claimed herein.

In this example, the system 100 is part of a larger access services network (not shown), and the system 100 includes a base station (BTS) 112, a BTS 114 and a BTS 116 each communicating with an access service network (ASN) 102. Also shown in system 100 are a BTS 106, a BTS 108 and a BTS 110 each communicating with an ASN 104. The ASN 102 communicates with the ASN 104 (via wireless or wireline communications). Included as a part of each ASN 102, 104 is one or more BTS controllers, in the form of gateways or servers 120 (FIG. 1 illustrates gateways X1 through X3 within ASN 102 and Y1 through Y3 within ASN 104).

One problem prevalent in wireless communications, irrespective of the protocol or standard upon which it is based, is that when a communication device (such as a subscriber station, also referred to as a mobile station) moves from one area to another area, the signal strength may vary and ultimately may decline to a level insufficient to maintain communications or, in any event, high data rates. Even when a mobile station is within the theoretical range of one BTS, physical obstacles or other conditions may inhibit communication with the BTS. In such a case, communications may be disrupted or lost. In response to movement outside the BTS coverage area or when other factors inhibit or reduce reliability of communications with the BTS, the BTS (or network) may initiate a communications handoff from the servicing BTS to another BTS to improve the communications link to the communications device. This necessarily requires knowledge of the BTS's neighbors.

As described above, the identification and provisioning of each BTS's neighbors within the system is usually performed manually within each BTS and/or the ASNs at the time of initial network setup or when a resource is added to, or removed from, the existing network. This manual provisioning is time-consuming, expensive and relatively static. In addition, network operating conditions (e.g., coverage range of a base station, which is based on various factors) may change substantially over time and as a result, coverage area of a given BTS may be different than that relied upon when the BTS neighbors were initially provisioned for each BTS. Therefore, those BTSs identified as neighbors for a given BTS may not truly be neighbors and problems with handoffs may occur.

One disclosed method (or methods) to overcome these problems is the use of automatically discovered and/or dynamically updated neighbor relations to configure the system 100. A neighbor's relation 118 is shown as a box that illustrates that the BTS 112 and the BTS 110 are neighbors. Details as to the manner by which automatic discovery is implemented are provided in the below specification. The automatically discovered and dynamically updated relations promote automatic configuration and optimization of the network 100. For instance, traffic among a plurality of mobile stations (MS) can be balanced among a plurality of BTSs. Moreover, signal loss or interruptions may be anticipated based upon empirical signal conditions to promote a handoff from one BTS to another BTS prior to the detection of a signal loss. Network operating conditions can be measured periodically to provide for generation of an updated neighbor list for a given BTS, thus allowing for a high degree of dynamic BTS neighbor tuning and/or optimization. These, and other innovative and unique aspects of the present disclosure, will be discussed in more detail below.

The ASN 102 and the ASN 104 may include one or more local area networks ("LAN"), metropolitan area networks ("MAN"), wide area networks ("WAN"), all or portions of a global network, or any other communication system or systems at one or more locations, or combination of these, including the public switched telephone network (PSTN), Internet, packet networks and the like. The ASN typically also includes a BTS backhaul network (not shown) which is a data network utilized for communications between the BTSs and ASNs. These networks may be configured to include Internet, packet networks and the like. In one embodiment, the ASNs 102, 104 (or portions thereof) are Internet Protocol (IP) based networks, and in another specific embodiment, the system or network 100 operates in accordance with the WiMAX standard (IEEE 802.16). It is understood that one or more servers (not shown) may communicate through the ASN 102 and the ASN 104.

Other components, devices or networks may be included in the system 100, and FIG. 1 only illustrates but one exemplary configuration to assist in describing the system and operation to those skilled in the art. The system 100 represented in FIG. 1 may be described using different nomenclature or system terminology, such as use of the terms access terminal (AT) or mobile subscriber terminals (MS or MT) or subscriber stations (SS), base station (BS) or base transceiver station (BTS) (as well as Node B, enhanced Node B and so forth), and the use of any given nomenclature to describe a device within the system 100 is not intended to limit the scope of this disclosure. As will be understood by those skilled in the art, air interface technologies utilized by BTSs in the system 100 may encompass technologies or standards such as, by way of non-limiting example, 2G, 2.5G, 3G, GSM, IMT-2000, UMTS, iDEN, GPRS, 1×EV-DO, EDGE, DECT, PDC, TDMA, FDMA, CDMA, W-CDMA, LTE, TD-CDMA, TD-SCDMA, GMSK, OFDM, WiMAX, the family of IEEE 802.11 standards, the family of IEEE 802.16 standards, IEEE 802.20, etc. For example, the WiMAX standard defines two network architectures or modes: point-to-multipoint (PMP) mode and mesh mode. In the PMP mode, every subscriber station directly communicates with a BTS and may indirectly communicate with another subscriber station but only through a BTS first. This network mode has a star structure with the BTS at the center of the star. In the mesh mode, every subscriber station is operable to directly communicate with every other subscriber station—the BTS is not required. The architecture illustrated in FIG. 1 implements the PMP mode, as subscriber stations receive instructions from the BTS unit they are communicating with. However, it is expressly understood that the innovative elements of the present disclosure could be implemented in either a PMP mode or other modes and, as noted previously, the teachings of the present invention are independent of air interface standard and technology.

The BTSs (e.g., 106, 108, 110, 112, 114, 116) have coupled thereto one or more subscriber stations (not shown). The subscriber stations are operable for communicating wirelessly with (or to) the BTSs over an air interface. In the system 100, any number of subscriber stations may be present up to the capacity of the network. Each subscriber station within the system 100 may be fixed or mobile (including nomadic) communication devices. It is to be understood for the purpose of this detailed description that subscriber station data rate transmission/reception is not limited to any specific rate and that mobility of mobile subscriber stations is not limited to any specific rate of movement.

A conventional BTS generally includes various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional components and software processes (functionality) of a BTS, other than as noted herein or relevant for an understanding of the present disclosure, is provided, as these are known to those of ordinary skill in the art. It will be understood that the BTSs may be constructed or configured from any suitable hardware, software, firmware, or combination thereof for providing the functionality known to those of ordinary skill in the art. The BTSs will include additional functionality as described below in accordance with one or more embodiments.

Figure 2:
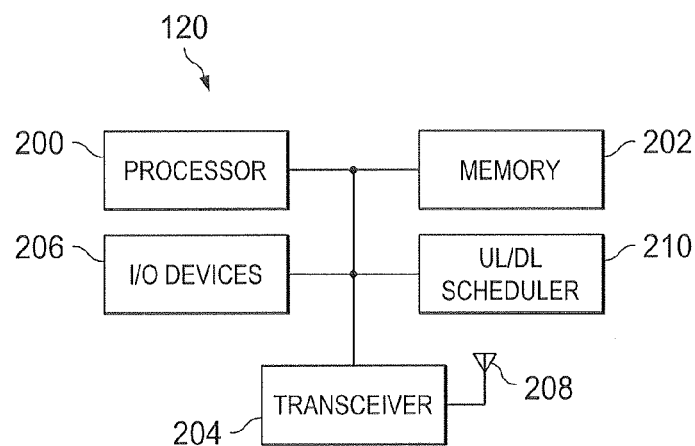
FIG. 2 is a block diagram of a system used within a ASN shown in FIG. 1, in accordance with one embodiment of the present disclosure.

Now turning to FIG. 2, there is shown a block diagram of an ASN gateway or server 120 within the ASN 102 or the ASN 104 in accordance with the present disclosure. The gateway 120 includes a processor (which may include a digital signal processor) 200, a memory 202, a transceiver 204, input/output devices 206, and an antenna 208. Other components may be included, but are not shown. Details of the operation and structure of these components, except as necessary to illustrate the operations and methods described herein, have been omitted. The gateway includes a scheduler 210. Though shown as a separate component, the scheduler 210 is normally a software process (or logical entity) that controls and manages scheduling of data.

Figure 3:
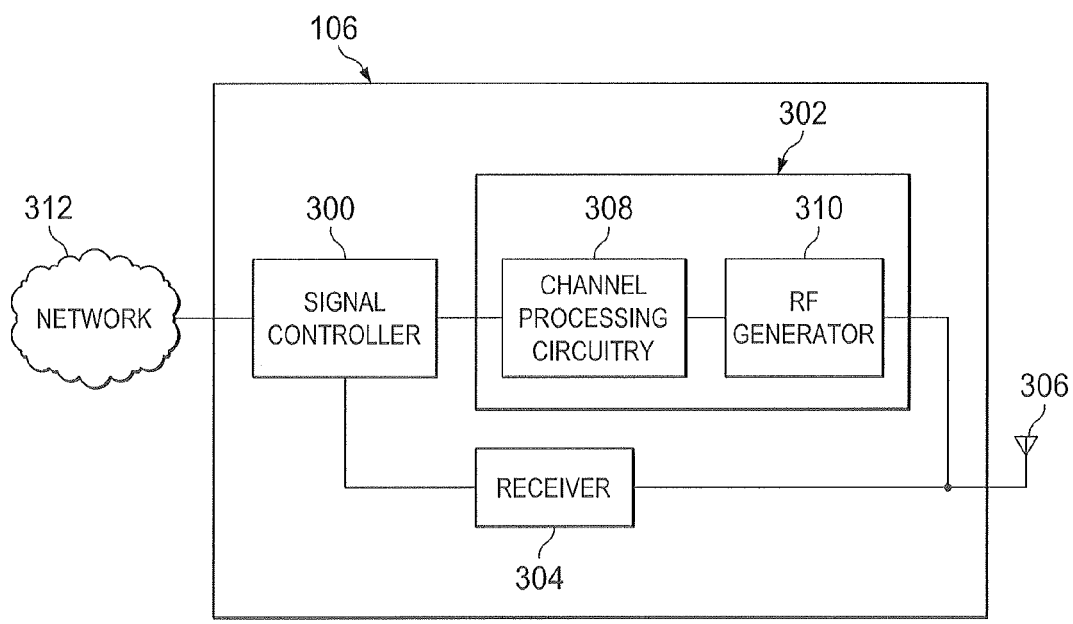
FIG. 3 is a reference diagram of a BTS, according to one of the disclosed embodiments, in accordance with one embodiment of the present disclosure.

Now turning to FIG. 3, exemplary BTS 106 (and BTSs 108, 110, 112, 114 and 116) is a medium to high-power multi-channel, two-way radio in a fixed location. Such BTSs are typically provided for communication with subscriber stations in the form of relatively low-power, single-channel, two-way radios or wireless devices such as mobile phones, portable phones, wireless computer networking cards (such as PCM/CIA and other wireless connectivity devices) and wireless routers. The BTS 106 may comprise a signal controller 300 that is coupled to a transmitter 302 and a receiver 304. The transmitter 302 and the receiver 304 (or combined transceiver) may further be coupled to an antenna 306. In the BTS 106, digital signals are processed in channel processing circuitry 308 and the digital signals may be signals for a wireless communication system, such as signals that convey voice or data intended for a mobile terminal (not shown). The signal controller 300 sends the digital signals to the transmitter 302 which includes the channel processing circuitry 308 that encodes each digital signal and a radio frequency (RF) generator 310 that modulates the encoded signals onto an RF signal. The resulting RF output signal is transmitted over the antenna 306 to a subscriber station (not shown).

In addition, the antenna 306 also receives signals sent to the BTS 106 from subscriber stations. The antenna 306 couples the received signals to the receiver 304 that demodulates them into digital signals and transmits them to the signal controller 300 and relayed to an associated gateway 120. The BTS 106 may also include auxiliary equipment such as cooling fans or air exchangers for the removal of heat from the BTS 106. As will be understood by those skilled in the art, the BTS 106 may employ any suitable wireless technologies or standards such as 2G, 2.5G, 3G, GSM, IMT-2000, UMTS, iDEN, GPRS, 1×EV-DO, EDGE, DECT, PDC, TDMA, FDMA, CDMA, W-CDMA, LTE, TD-CDMA, TD-SCDMA, GMSK, OFDM, WiMAX, the family of IEEE 802.11 standards, the family of IEEE 802.16 standards, IEEE 802.20 and the like, and can be used in a variety of applications, including cellular, WLAN, MAN and Femtocell communications networks.

Figures 4, 5:
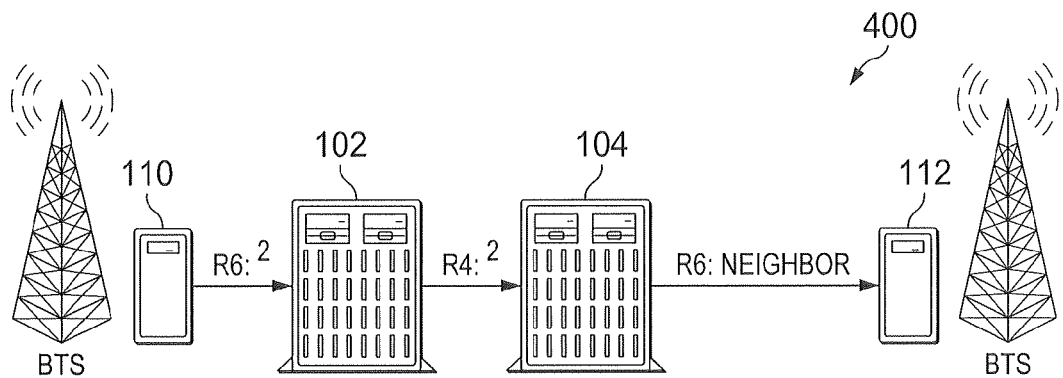
FIG. 4 is a reference diagram of the messages transmitted between BTS stations and ASNs shown in FIG. 1, in accordance with one embodiment of the present disclosure.
FIG. 5 is an illustration of informational elements used in determining a list of neighbor BTS, in accordance with one embodiment of the present disclosure.

FIG. 4 is a simplified diagram of communication paths and messages between the BTS 110, the BTS 112, the ASN 102, and the ASN 104 in a WiMAX compliant network. With concurrent reference to FIGS. 1 and 4, the BTS 110 exchanges information with the gateway 12 (Y1) within ASN 102 and the BTS 112 exchanges information with the gateway 120 (X1) within ASN 104. Each of these communication paths is referred to as an "R6 interface" (as defined in the WiMAX standard). The ASN 102 and the ASN 104 exchange information over an "R4 interface" (as defined in the WiMAX standard). Though these paths are described as the R6 and R4 interfaces in accordance with WiMAX, other communication protocols or standards may be utilized. It is explicitly understood that the ASN 102 and the ASN 104 may each include one or more gateways 120, routers, servers, and other communication devices that make up an autonomous system. Communications over these paths and interfaces may include information as shown in FIG. 5.

FIG. 5 is a chart 500 that describes information elements (IE), status of those elements (e.g., M for mandatory and O for optional), and notes describing the contents of each element comprised within traffic exchanged by BTSs and ASNs. The information includes IEs 510, 520, 530, 540, and 550. The IE 510 includes BTS location::latitude information while the IE 520 includes BTS location::longitude information. The IE 530 includes BTS coverage range information (range in meters). In addition, the IE 540 includes BTS antenna center angle direction information (direction antenna associated with the BS is pointing) while the IE 550 includes BTS antenna coverage angle information (angle over which the antenna associated with the BS can receive and transmit RF signals). The information exchanged between BTSs and ASNs may further include (not shown): IP address of each BTS (IP Address), a unique BTS identifier (BTS ID), preamble index and center frequency.

As will be appreciated, a given BTS may include one or more "sectors". Conventional BTSs generally include three or six sectors (approximately 120 or 60 degrees each) and therefore, may be described as including three or possibly six sectors. Therefore, each sector within a BTS has a set of IEs that can be utilized to describe it. As will be appreciated, some information, such as location, is typically the same for each sector within a given BTS (e.g., each sector would have the same location information) while other information, such as coverage range, antenna coverage angle, and antenna center direction parameters, could be different.

It will be understood that each IE 510, 520, 530, 540 and 550 may be transmitted in separate packets or messages, or two or more IEs may be transmitted collectively within a single packet or message. Though not shown, each packet or message will typically include an identification field that identifies the included data as latitude, longitude, coverage range, or antenna angle information. In one embodiment, the BTS location::latitude information and BTS location::longitude information each includes four octets (32 bits) of data representing degrees, minutes, seconds as integer values. The BTS coverage range information may be provided using four octets (32 bits) in a single integer denoting the range in meters. The BTS antenna center direction information and the BTS antenna coverage angle information may be provide using at total of four octets (32 bits) with two integer values (alternatively, each parameter could be transmitted separately). For each of the above, all 0's may be used to represent an unknown status.

It is understood that these packets or messages will be used within communications between BTSs and their associated ASNs (or gateways) and also between ASNs using the communication paths R6 and R4, respectively, as more fully described below.

Figure 6:
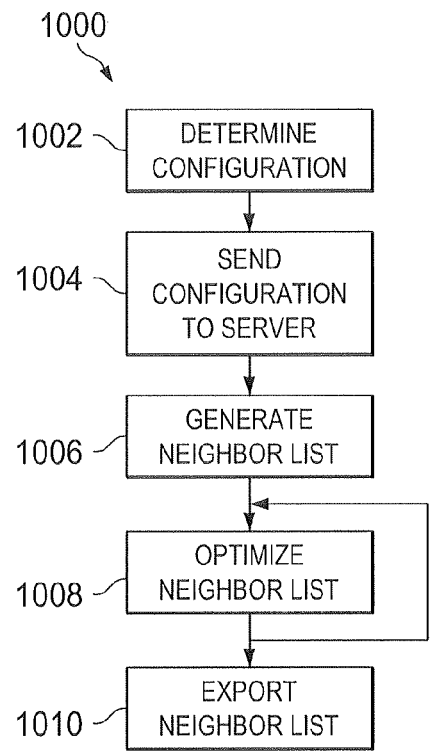
FIG. 6 depicts one method of implementing the disclosed embodiments.

Moving from the hardware and information elements described above used to implement the disclosed systems and methods, one method of performing automatic identification and learning of base station neighbors is illustrated in FIG. 6.

As previously described, BTS neighbor determination in a conventional wireless network is provisioned manually. This approach requires a BTS neighbor list to be provisioned for each BTS and a change to BTS neighbor lists when the BTS topology changes (BTS added or removed). Further, there is no method to update neighbor lists based on BTS operational status (up/down).

In accordance with the present disclosure, automatic determination of BTS neighbor lists provides significant advantages over prior art provisioning methods. As the network topology or operating conditions change, BTS neighbor lists can be generated and/or updated automatically and dynamically (e.g. periodically or event-based driven).

In general terms, the present disclosure provides a method of generating neighbor lists when there is a change in the number and/or operational status of BTSs within the system 100. The neighbor list provides the given BTS with knowledge of its neighboring BTSs. Neighbor lists allows BTSs to proactively avoid interruptions in service by handing subscriber station communications off to a neighbor BTS when there are communication problems or for the purpose of balance BTS loads during times of high demands (e.g., where a first BTS and second BTS are neighbors, if the first BTS has a very high usage, and the second BTS has a low usage, the first BTS can hand over all or a portion of its ongoing call sessions to the second BTS). In the instance of a newly added BTS to the system, the newly added BTS transmits its configuration parameters (IEs) (e.g., one or more of location, coverage range, antenna direction and coverage angle, IP address, BTS ID, preamble index and center frequency) to its associated gateway 120 within a respective ASN. After collecting this information, the gateway 120 propagates some or all of this information to peer gateway(s) 120 within the system 100. The gateway(s) 120 utilize the received BTS attributes, such as IEs, (received from its own BTSs and the other gateways 120) and generate BTS neighbor lists for the added BTS and any BTSs associated with it (i.e., having overlapping coverages). The gateway(s) 120 then send the BTS neighbor lists to the newly added BTS and its associated BTSs.

It is expressly understood that a neighbor list may be created by any member of system 100. In some embodiments, each gateway may create a neighbor list for each BTS in communication with the gateway. In other embodiments, a single gateway will create a neighbor list for each BTS in system 100. In yet other embodiments, each BTS may have sufficient information sent to the BTS through a gateway to allow for the creation of its own neighbor list. These neighbor lists allow for the handoff of communications from one BTS to another BTS, according to the neighbor list.

In another method, BTS neighbor lists may be dynamically updated periodically to take into account network operating conditions. This may be done globally or within a specified region of the network. In yet another method, BTS neighbor lists may be dynamically updated in response to a change in network operating conditions. Similarly, this may be performed on a global basis, regionally, or at or around a given BTS. In either method, the gateway(s) 120 collect the BTS configuration parameters and information, generate neighbor lists, and propagate the neighbor lists to its associated BTSs. This allows for dynamic tuning, enhancement and optimization of BTS neighbor lists. FIG. 6 illustrates a method 1000 of creating a neighbor list for a given BTS. In this method, configuration parameters (such as Information Elements (IEs") or other information concerning a given BTS (such as BTS 112) is determined (step 1002) and transmitted to its associated gateway (such as gateway 120(X1)) (step 1004). Such determination can be undertaken by one or both of the BTS and associated gateway 120. The gateway 120 (X1) generates a neighbor list on the basis (at least in part) of the transmitted received BTS configuration parameter information and BTS configuration parameter information of other BTSs, such as BTS 110 (step 1006). The BTS configuration parameter information of the other BTSs is/was obtained directly from the BTSs or via their associated gateways, such as gateway 120(Y1). In an optional step, the generated neighbor list may be optimized (step 1008) through a single or iterative process. The generated BTS neighbor list is sent to the BTS 112.

The above described method 100 illustrates the generation of the neighbor list for a single BTS 112. It will be understood that the method may be performed for additional BTSs, where each gateway 120 retrieves BTS configuration parameter information from each BTS it manages, each gateway 120 sends this information to the other gateways 120, each gateway 120 creates neighbor lists and sends a respective list to each managed BTSs.

In one embodiment, BTS neighbor list generation may occur without antenna direction and coverage angle information, and utilizes BTS location and coverage range information. This approach considers the BTS coverage area as a circle defined by the BTS location and coverage range. Two BTSs are defined as neighbors if their coverage areas are intersecting circles. In another embodiment, BTS neighbor list generation further utilizes antenna direction and coverage angle information. This approach considers the BTS coverage area as a convex polygon defined by the BTS location, coverage range and antenna direction and coverage angle information. Two BTSs are defined as neighbors if their coverage areas are intersecting polygons. It is understood that elements from both embodiments might be used together, and these embodiments are presented solely for the purpose in aiding in understanding the present disclosure.

In a first embodiment, the gateway 120(Y1) receives the following information directly from the BTS 110:
BTS 110:
Longitude (in radians): LONGa
Latitude (in radians): LATa
Coverage range (in km): Ra and also receives the same type of information from BTS 106 and BTS 108. The gateway 120(Y1) propagates this information to the gateway 120(X1). Similarly, BTS the gateway 120(X1) receives the following information directly from the BTS 112:
BTS 112:
Longitude (in radians): LONGb
Latitude (in radians): LATb
Coverage range (in km): Rb and also receives the same type of information from BTS 114 and BTS 116. The gateway 120 (X1) similarly propagates this information to the gateway 120(Y1). In one aspect of the invention, each gateway 120 uses equation (1) below to determine whether any pair of BTSs are neighbors (if the inequality is true, the base stations are neighbors, if it is false they are not):

$$\text{DISTANCE}(BSa, BSb) < Ra + Rb \quad (1)$$

where DISTANCE (BSa, BSb) is defined by Equation (2) below:

$$\text{DISTANCE}(BSa, BSb) = \cos(\cos(\text{LONG}a)*\cos(\text{LAT}a) \\ *\cos(\text{LONG}b)*\cos(\text{LAT}b) + \cos(\text{LONG}a)*\sin \\ (\text{LAT}a)*\cos(\text{LONG}b)*\sin(\text{LAT}b) + \sin(\text{LONG}a) \\ *\sin(\text{LONG}b))*6378 \quad (2)$$

In the example illustrated in FIG. 1 and described above, BTS 110 and BTS 112 are neighbors.

Figure 7:
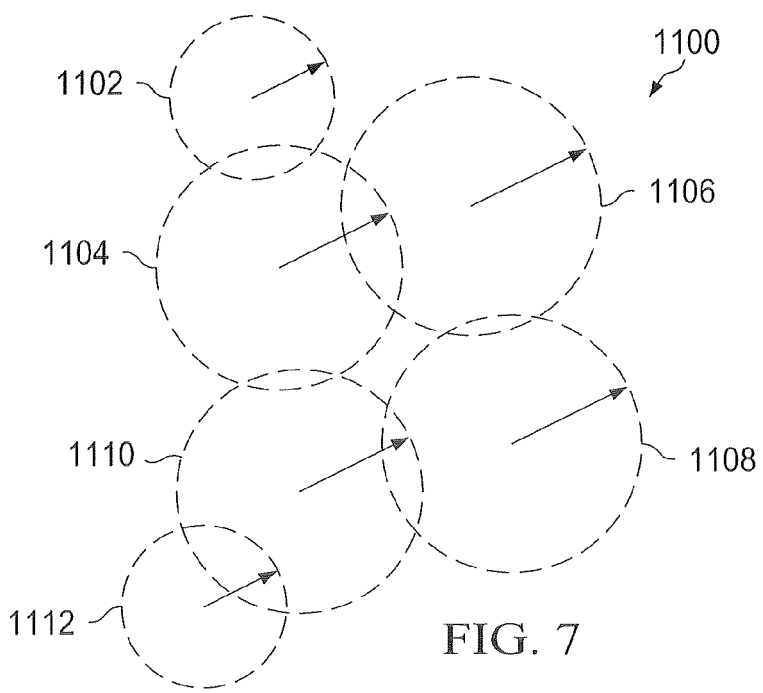
FIG. 7 depicts ranges of various BTSs used to create a list of BTS neighbors, according to one of the disclosed embodiments.

This approach is useful when looking at a plurality of BTS stations. FIG. 7 shows a plurality of BTSs 1102, 1104, 1106, 1108, 1110, and 1112. Using Equation (1) the following neighbor list may be created:

BTS: Neighbors
1102: 1104
1104: 1102, 1106, 1110
1106: 1104, 1108
1108: 1110, 1106
1110: 1104, 1108, 1102
1112: 1110

It is explicitly understood that any or all of the BTS may be connected to separate ASNs.

The first embodiment is useful in the initial configuration of the system 100 or when network operating conditions affect one or more BTS coverage ranges. When BTS coverage ranges change due to operating conditions and the BTS (or its managing gateway) has functionality to calculate its own BTS coverage range, the first embodiment may be utilized to dynamically tune or update the neighbor list(s). BTS coverage range may be calculated based on any factors that may affect range, including power level, receiver sensitivity, modulation efficiency (no variation with frequency), shadow margin, path loss, physical environment, and cable loss (variation with frequency). As noted above, this technique may be done periodically (whether or not any BTS coverage ranges have been detected as having changed) or in direct response to a coverage range detection. The network 100 may initiate a periodic neighbor list update process that causes each BTS (or its associated gateway) to calculate its coverage area and transmit it (along with its location) to the gateways (which then generate updated or dynamically tuned neighbor lists).

It will be understood that additional information about BTS configurations may be useful in tuning and optimizing the network. For instance, further information may be gathered and used including, but not limited to, antenna direction angle, antenna coverage angle, power level, receiver sensitivity, modulation efficiency (no variation with frequency), shadow margin, path loss, physical environment, cable loss (variation with frequency) with location and range information. This information may be used to determine range of the BTS.

Figure 8:
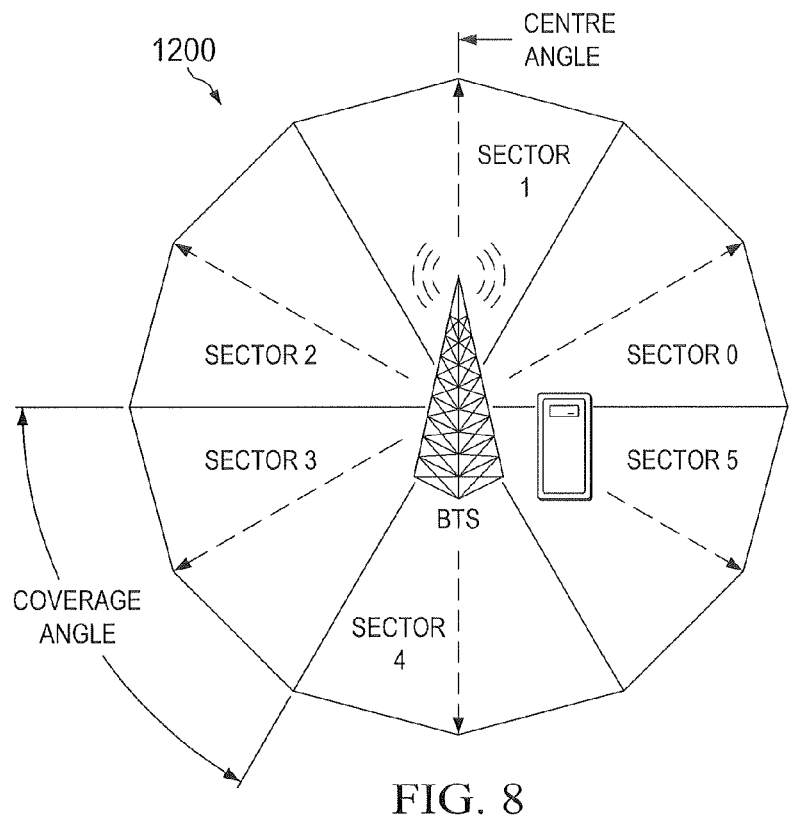
FIG. 8 is an illustration of the coverage angle of a BTS, according to one of the disclosed embodiments.

FIG. 8 is an example showing a BTS 1200 at the center with a plurality of antenna center angles within a coverage area. As shown by FIG. 8 there may be a plurality of antenna center angles (created by a plurality of antennas located on the BTS) present within the coverage range of the BTS 1200. This figure also shows a plurality of sectors shown within the coverage range.

By intelligently determining and using sector information, a number of factors may be determined. For instance, location within the coverage area may be blocked by a physical barrier to a signal that renders a subscriber station unable to communicate with the BTS 1200 even though the subscriber station is located within the range of the BTS 1200. Through tracking of dropped calls or loss of signal to the BTS 1200, the BTS 1200 can determine that an impediment exists in a particular sector and adjust the coverage range that it transmits to the gateway 120 for that sector. Through this intelligent determination of sector information, the true range and capability of the BTS 1200 can be determined. When a subscriber station enters a sector where there is such an impediment, the BTS 1200 checks the neighbor list to determine if there is a suitable neighbor BTS for handoff of the communication. Therefore, the neighbor list promotes maintenance of communications sessions between mobile devices and BTSs.

Figure 9:
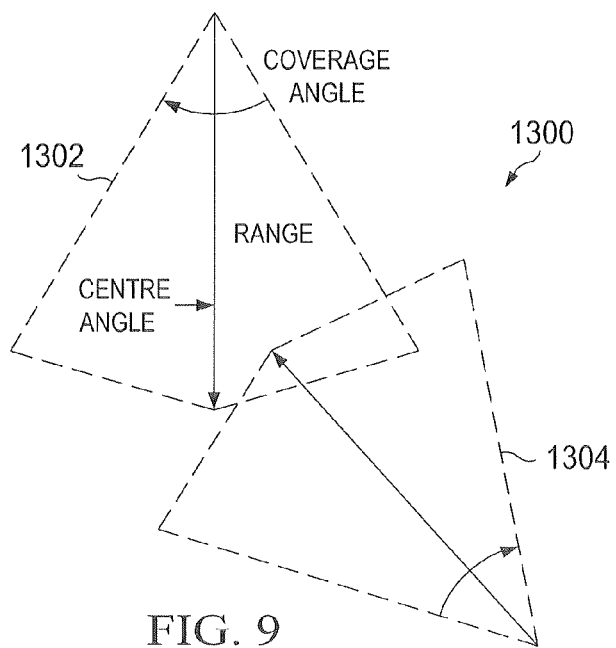
FIG. 9 is an example of the coverage area between two neighbors, according to one of the disclosed embodiments.

FIG. 9 illustrates an overlap of a sector from a BTS 1302 and a sector from a BTS 1304. As shown, the range and coverage angle may be used to determine the area in which the BTS has effective coverage. The BTS 1302 and the BTS 1304 also are shown to have a limited area of overlap. Through the identification of this overlap, the location and timing of handoffs between the BTS 1302 and the BTS 1304 may be determined and optimized prior to a subscriber station entering the coverage area. This type of novel tuning, that exists prior to any real MS entering the coverage area of the BTS 1302 or the BTS 1304, allows for the optimization of a network based upon the plurality of factors above without the need to manually tune a network (i.e., manually adjust the neighbor lists). In addition, it can be identified where a BTS has no effective coverage simply by determining areas where signal losses consistently occur.

The BTS 1302 and the BTS 1304 are neighbors only for some of the sectors that are present within the BTS 1302 and the BTS 1304. In the more complex model, a list can be generated that includes both the BTS and the sector of the BTS that is a neighbor of another BTS:

BTS: Neighbors (SECTOR)
1302: 1304(4)
1304: 1302(2)

Figure 10:
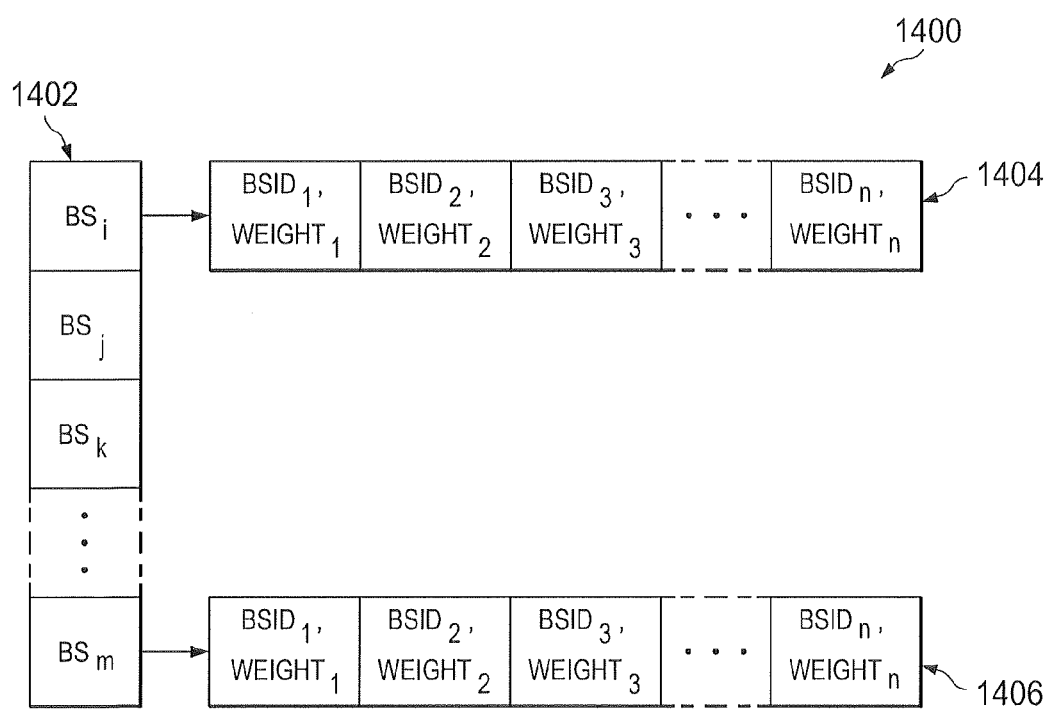
FIG. 10 depicts priority messages based upon a neighbor list.

The information obtained through the methods described in the more complex model may be used to tune and optimize the network. As illustrated by FIG. 6, the tuning and optimizing of the network may be performed through an iterative process that allows for constant retuning and updating based upon the actual capabilities of each BTS within the network. FIG. 10 is an example of the neighbor list that may be generated by a gateway 120.

In the example shown in FIG. 10, blocks 1402 are a list of the BTSs within the network 100. Blocks 1404 relate to the relative weight of each BTS for communication with a first BTS. Blocks 1406 relate to the relative weight of each base station for communication with a second BTS. For instance, using the example shown in FIG. 11, the blocks in 1402 might appear as 1102, 1104, 1106, 1108, 1110, and 1112. The weights for block 1104 might be 1102 (50), 1106 (30), and 1110 (20). Therefore, BTS 1102 has the highest communication priority with BTS 1104. As is shown by FIG. 6, each BTS has its own neighbor list and priority list. This priority list could further be expanded to consider the sector for which the transmission is in. In such a case, blocks 1404 would include BTS sector information as well as weights. For example, the following list could be used using the example from FIG. 9:

BTS (SECTOR): Neighbors (SECTOR), Weight
1302(1): 1104, 50
1302(2): 1104, 0

Even though BTS 1302 and BTS 1304 are neighbors, it does not follow that every sector of BTS 1302 is within the range of every sector within BTS 1304. Through the more complex method, a precise sector-to-sector neighbor list may be created.

The neighbor list and weights of the neighbor list may be created through a plurality of messages from both gateways 120 and BTSs. One method of creating weights is by incrementing the weight of the BTS based upon successful or unsuccessful communication. In this example, if a subscriber station has a successful communication session with the BTS, the weight of the BTS may be increased. If the communication with the BTS was unsuccessful, the weight of the BTS may be decreased.

The neighbor list, and weights of the neighbor list, may also be created through a plurality of messages from the ASN 102 and the BTS 114. In one example, a mobile station is within the range of the BTS 110 and the BTS 114 and the mobile station transmits a list of all BTSs within the range of the mobile station to BTS 110. This information is then relayed to the ASN 102 through BTS 110. A HO_Req message may then be sent from BTS 110 comprising the list of target candidate BTSs seen by the mobile station to other BTSs, including BTS 114. This candidate list can be used as feedback to dynamically tune the BTS 114 at runtime, by providing the BTS 114 a list of BTSs that the mobile station is aware of. It may be assumed if the mobile station is aware of a plurality of BTSs, each of the BTSs must share at least some coverage area (e.g., in this example, the BTS 110 and the BTS 114 would share some coverage area). The ASN 102 may also send a HO_Cnf message that comprises a list of all BTSs for a mobile station that are within the range of the mobile station to all of the BTSs within the range of the mobile station. It is understood that the HO_Req and Ho_Cnf are R6 messages which can be sent from the BTS to the ASN.

In addition to the BTS 110 sending the list of target BTSs seen by the mobile station to the ASN 102, the mobile device may send a MOS_MSHO_REQ message with a list of target BTSs identified by the mobile devices to other BTSs within the range of the mobile device (e.g. BTS 114). The mobile device may also send an individual message, MOS_MSHO_IND, to the BTS that has been selected for communication with the mobile device. If the target BTS reports successful communication or handoff, the weights of the BTS may be adjust accordingly. Therefore, these messages may be used to determine the weight for each BTS to communicate with another BTS. It is understood that the MOS_MSHO_REQ and MOS_MSHO_IND are messages sent from the mobile device to the BTS. Messages that are sent between a mobile device and a BTS may be referred to as R1 messages.

The neighbor list, and weights of the neighbor list, may also be created through a plurality of messages from the ASN 102 and the BTS 114. In one example, a mobile station is within the range of the BTS 110 and the BTS 114 and the mobile station transmits a list of all BTSs within the range of the mobile station to BTS 110. This information is then relayed to the ASN 102 through BTS 110. A HO_Req message may then be sent from ASN 102 comprising the list of target candidate BTSs seen by the mobile station to other BTSs, including BTS 114. This candidate list can be used as feedback to dynamically tune the BTS 114 at runtime, by providing the BTS 114 a list of BTSs that the mobile station is aware of. It may be assumed if the mobile station is aware of a plurality of BTSs, each of the BTSs must share at least some coverage area (e.g., in this example, the BTS 110 and the BTS 114 would share some coverage area). The ASN 102 may also send a HO_Cnf message that comprises a list of all BTSs for a mobile station that are within the range of the mobile station to all of the BTSs within the range of the mobile station.

In addition to the BTS 110 sending the list of target BTSs seen by the mobile station to the ASN 102, the BTS 110 may send a MOS_MSHO_REQ message with a list of target BTSs identified by the mobile devices to other BTSs within the range of the mobile device (e.g. BTS 114). BTS 110 may also send an individual message, MOS_MSHO_IND, to the BTS that has been selected for communication with the mobile device. If the target BTS reports successful communication or handoff, the weights of the BTS may be adjust accordingly. Therefore, these messages may be used to determine the weight for each BTS to communicate with another BTS.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like. While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
    determining a local node configuration for a local network node, wherein the local network node configuration comprises a local range, a local location, measured power level information received at the local node from a subscriber station, and sector information, the local range defining a range of coverage for the local network node, wherein the received measured power level information is used to determine the range of coverage;
    receiving via a communications link a remote network node configuration for a remote network node, wherein the remote network node configuration comprises a remote range, a remote location, and sector information, the remote range defining a range of coverage for the remote network node; and
    generating a neighbor list comprising the remote network node and the local network node, wherein the neighbor list is determined using the local network node configuration and the remote network node configuration.

2. The method of claim 1, wherein the neighbor list comprises the angles in which the local network node is a neighbor to a remote network node.

3. The method of claim 1, wherein the local network node is a base transceiver station.

4. The method of claim 1, further comprising updating the neighbor list based upon usage information.

5. The method of claim 1, wherein the local network node is configured to use data including the signal strength from mobile stations to determine the range of the local network node.

6. The method of claim 1, wherein one or both of the local network node or the remote network node is a long-term evolution (LTE) network node.

7. The method of claim 1, further comprising:
    identifying an area overlapped by the local network node and the remote network node; and
    determining location and timing of handoff between the local network node and the remote network node based on the identification, prior to the subscriber station entering coverage area of the local network node or the remote network node.

8. The method of claim 1, wherein the local range and the local location define a coverage area of the local network node, the remote range and the remote location define a coverage area of the remote network node, and generating a neighbor list comprises determining the local network node and the remote network node are neighbors if their coverage areas intersect.

9. A method, comprising:
    obtaining a first information about a first base station, wherein the first information comprises location information, range information, measured power level information received at the first base station from a subscriber station, and angle information relating to the first base station, the range information of the first information defining a range of coverage for the first base station, wherein the received measured power level information is used to determine the range of coverage;
    sending the first information about the first base station to a first server;
    obtaining a second information about a second base station, wherein the second information comprises location, range information, and angle information relating to the second base station, the range information of the second information defining a range of coverage for the second base station;
    sending the second information about the second base station to the server;
    generating a neighbor list from the first information and the second information;
    transmitting, at the server, the neighbor list to the first base station and the second base station; and
    storing the neighbor list in the first base station and the second base station.

10. The method of claim 9, wherein the first information further comprises information related to the signal strength of the first base station.

11. The method of claim 10, further comprising updating the neighbor list based upon usage information.

12. The method of claim 11, further comprising handing off communication between a mobile station from the first base station to the second base station based upon the neighbor list.

13. The method of claim 12, wherein the handing off of the mobile station is performed through a wireless communication channel.

14. The method of claim 9, wherein the server is part of a packet switched network.

15. The method of claim 14, wherein the server is a gateway.

16. The method of claim 9, further comprising a second server, wherein the server transmits the neighbor list to the first base station, and the second server transmits the neighbor list to the second base station.

17. The method of claim 16, wherein the handoff is based upon sector information.

18. A system, comprising:
- a first base station, wherein the first base station is capable of storing first identification information including range information of the first base station, location information of the first base station, measured power level information received at the first base station from a subscriber station, and sector information associated with the first base station, and wherein the first base station is capable of communication with a first network and wherein the range of the first base station defines a coverage range of the first base station, wherein the received measured power level information is used to determine the range of coverage;
- a second base station, wherein the second base station is capable of storing second identification information including range information of the second base station, location information of the second base station, and sector information associated with the first base station, and wherein the second base station is capable of communication with a second network and wherein the range of the second base station defines a coverage range of the second base station;
- a server, wherein the server is capable of communication with the first network and the second network, and wherein the server is capable of receiving the first and the second identification information, creating a neighbor list based upon the first and the second identification information, and transmitting the neighbor list to the first base station and the second base station.

19. The system of claim 18, wherein the sector information comprises angle information relating the first base station coverage angle.

20. The system of claim 18, wherein the sector information comprises direction information relating the first base station center angle.

* * * * *

UNITED STATES PATENT AND TRADEMARK OFFICE
CERTIFICATE OF CORRECTION

PATENT NO.        : 8,687,597 B2                                          Page 1 of 1
APPLICATION NO. : 12/221951
DATED             : April 1, 2014
INVENTOR(S)       : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this
Thirtieth Day of May, 2017

Michelle K. Lee
*Director of the United States Patent and Trademark Office*